W. G. CANION.
DEMOUNTABLE RIM.
APPLICATION FILED AUG. 27, 1919.
1,389,123.
Patented Aug. 30, 1921.
2 SHEETS—SHEET 1.
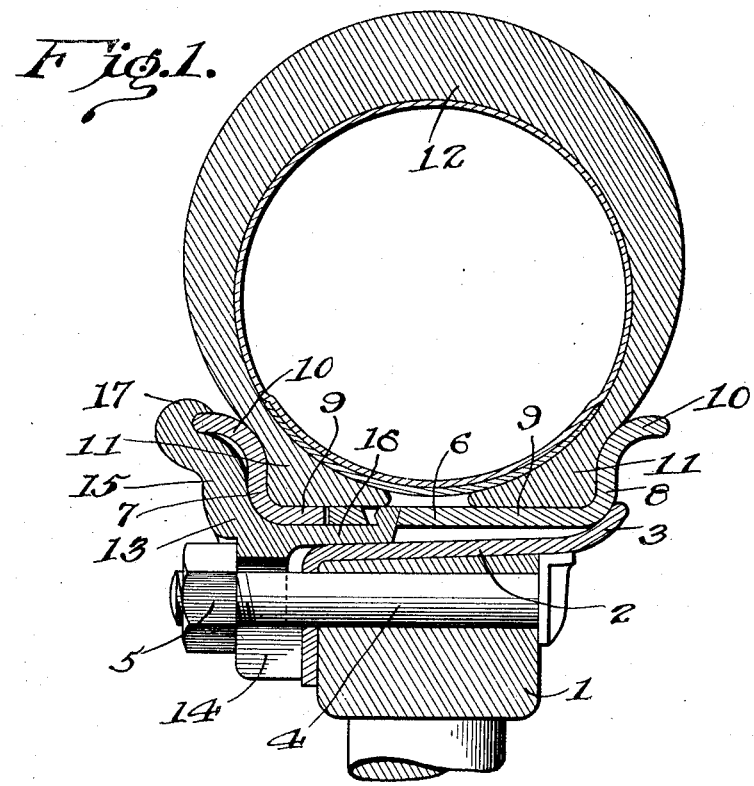
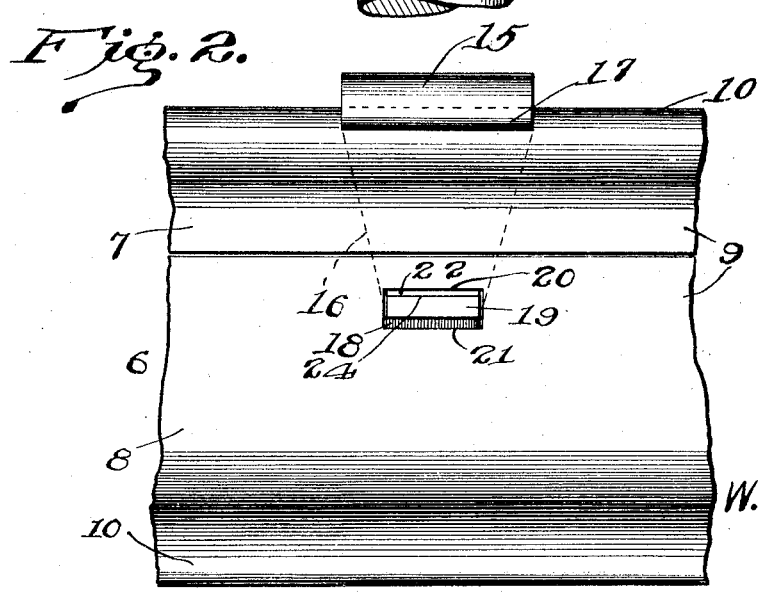
Inventor:
W. G. CANION,
By C. C. Hines,
Attorney.

W. G. CANION.
DEMOUNTABLE RIM.
APPLICATION FILED AUG. 27, 1919.
1,389,123.
Patented Aug. 30, 1921.
2 SHEETS—SHEET 2.
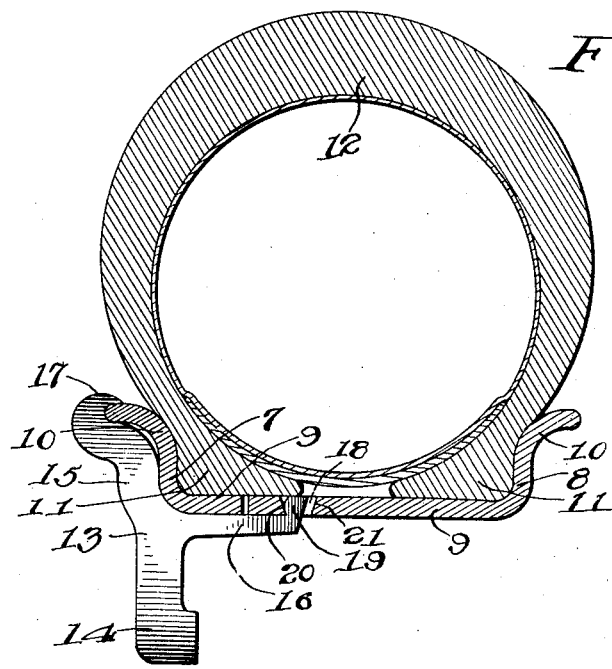
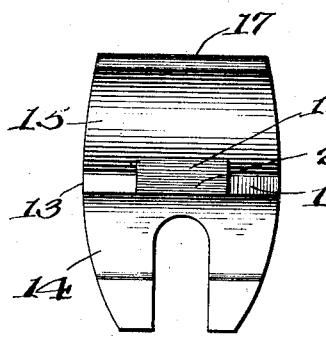
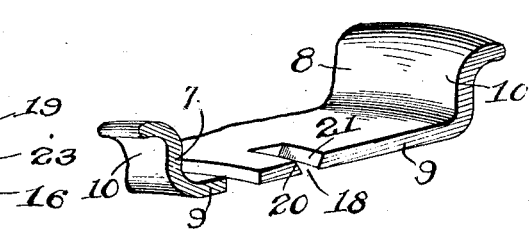
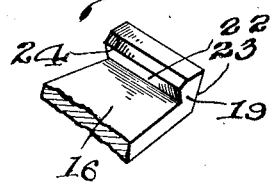
Inventor:
W. G. CANION,
By C. A. Hines,
Attorney.

UNITED STATES PATENT OFFICE.

WILLIAM GEO. CANION, OF GLEN BURNIE, MARYLAND, ASSIGNOR TO THE NATIONAL MANUFACTURING COMPANY, A CORPORATION OF MARYLAND.

DEMOUNTABLE RIM.

1,389,123.      Specification of Letters Patent.      Patented Aug. 30, 1921.

Application filed August 27, 1919. Serial No. 320,177.

*To all whom it may concern:*

Be it known that I, WILLIAM G. CANION, a citizen of the United States, residing at Glen Burnie, in the county of Baltimore and State of Maryland, have invented new and useful Improvements in Demountable Rims, of which the following is a specification.

This invention relates to automobile wheel rims, and particularly to rims of the sectional demountable type.

The object of the invention is to provide a circumferentially divided tire carrying rim which comprises two annular sections adapted to be separated to admit of the convenient and expeditious application and removal of the tire, combined with a single set of fastening devices for both securing said tire carrying rim to the fixed wheel rim and holding the sections of the tire carrying rim assembled when off the fixed rim so that a spare tire in inflated condition may be held on the tire carrying rim when so desired.

A further object of the invention is to provide fastening devices for the purpose described which take the place of and have the same function as the ordinary wedge fasteners in common use for securing the tire carrying rim to the fixed rim, thereby permitting of the use of my improved rim on any ordinary type of fixed rim commonly employed to receive the different forms of demountable rims in general use, and which fastening devices are readily removable from the tire carrying rim to admit of the separation of the sections thereof.

A still further object of the invention is to provide fastening devices which slidably couple the sections of the demountable rim to permit of certain locking and unlocking actions in the use of the demountable rim on and off the wheel rim.

With these and other objects in view, the invention consists of the features of construction, combination and arrangement of parts hereinafter fully described and claimed, reference being had to the accompanying drawings, in which:—

Figure 1 is a transverse section through a wheel felly and fixed rim, showing my improved demountable rim and a tire mounted thereon, Fig. 2 is a plan view of a portion of the demountable rim with the tire removed therefrom, Fig. 3 is a transverse section through the demountable rim and tire removed from the fixed rim, and illustrating the locking action of the fasteners for holding an inflated tire upon the removed demountable rim, Fig. 4 is an inner elevational view of one of the fasteners, Fig. 5 is a fragmentary sectional perspective view of the sections of the demountable rim separated, but arranged in proper relative positions, Fig. 6 is a detail view showing a feature of construction.

Referring to the drawings, 1 designates the rim of an automobile or other vehicle wheel, comprising a fixed felly band 2 having at one side, an abutment flange 3, against which one side of the demountable rim bears, the opposite side of said fixed rim being plain or unflanged to permit of the application and removal of the demountable rim in the usual manner. In the present disclosure, a wheel having a wooden felly and a metallic fixed rim is shown, but it is to be understood that the invention may also be applied to all-metal wheels. Bolts 4 are carried by the felly 1 to receive adjusting and clamping nuts 5 operable for adjusting and clamping in adjusted position the fastening devices, hereinafter described, whereby the demountable rim is secured to the fixed rim and the sections of said demountable rim are held detachably connected.

The demountable rim, generally indicated by 6, is circumferentially divided to provide a pair of complementary annular sections 7 and 8, each consisting of a base plate or body portion 9 having at its outer side a tire retaining flange 10, the said flanges 10 coöperating with the base plates to form a channeled rim to receive and hold the retaining beads 11 of the outer shoe or casing 12 of the pneumatic tire. It is to be understood that the flanges 10 may be of a form to receive an ordinary straight-side tire or of a form to receive and engage the beads of clincher tires, a tire of the straight-side type and a demountable rim of a form for receiving and holding the same being shown in the present instance.

Fastening devices 13 are provided for fastening the demountable rim to the fixed wheel rim, and also for detachably coupling the sections of the demountable rim. These fastening members 13 are designed to be used in lieu of the wedge fasteners commonly employed, it being understood that the bolts 4 are arranged at suitable intervals around the wheel and that a fastener 13 is provided for use in connection with each bolt. As shown, each fastener comprises a tri-armed body, having inwardly and outwardly extending radial arms 14 and 15 and a lateral arm 16. The arm 14 is adapted to be fitted over the threaded end of the bolt 4 and to be engaged by the nut 5, and is apertured or bifurcated for the passage of the bolt end therethrough. The arm 15 forms an abutment and clamping member to bear against the outer side of the flange 10 of the rim section 7 and is provided with a terminal hook 17 to engage and interlock with the rim edge of said flange, whereby a detachable interlocking connection is afforded between the fastening device and the said rim section 7. The lateral arm 16 is adapted to fit into the receiving space between the body plates of the rim members 1 and 6 and is tapered to form a locking wedge, the arms 16, as so far described, thus serving to perform the ordinary function of the wedge fasteners commonly employed to secure the demountable rim in position upon the fixed wheel rim. It will be apparent from the foregoing that upon removing the nuts 5, the demountable rim, tire and fasteners may be applied to or removed as a unit from the fixed rim, via the flangeless side of said fixed rim, and that when the parts mentioned are applied to the fixed rim and the nuts 5 fitted and tightened on the bolts, the wedges 16 will lock the rim members together, while the demountable rim sections 7 and 8 will be clamped between the flange 3 and the arms 15 of the fasteners.

In order to adapt the fastening devices for use in holding the rim sections 7 and 8 assembled when off the wheel, so that an inflated tire may be carried thereby, slots 18 are provided in the body 9 of the rim section 8 to receive and interlock with wedge-shaped lugs 19 on the wedge arms 16 of the fasteners 13. As shown, each slot 18 is of relatively greater length than width and of wedge-form, its relatively inner and outer side walls 20 and 21 being reversely beveled or inclined in an outward direction, or toward the outer face of the base 9 of the rim section 8. The lug 19 is of a length just slightly less than the length of the slot 18, but of relatively less width, the maximum width of the wedge-shaped lug being sufficiently less than the minimum width of the wedge-shaped slot to permit the lug, when properly positioned, to readily pass through the narrow base of said slot. The lug 19 has the beveled or undercut sides 22 and 23 for respective engagement with the walls 20 and 21 of the slot, and the side 21 is preferably formed with an acutely beveled tip 24.

In fitting a tire on the demountable rim, the rim sections 7 and 8 are slipped into engagement with the tire from opposite sides thereof, and the fasteners then engaged with the rim sections to hold the same assembled, as shown in Fig. 3. The lateral pressure of the tire beads on the flanges 10 of the rim sections due either to its natural resiliency or to the presence of air, tends to force the rim sections apart to a degree somewhat greater than that shown in Fig. 3. In applying the fasteners 13, the hooked ends 17 of the arms 15 thereof are engaged with the edge of the flange 10 of the rim section 7 and the fasteners (the arm 14 being grasped and used as a handle or lever) swung inwardly so as to bring the wedge arm 16 into locking position. At this time, the rim members will be spread to such a degree by the pressure of the tire, as previously explained, that the lug 19 will be outwardly beyond and out of register with the slot, but by inward pressure on the rim section 7, the edges of the base plates 9 of the rim sections 7 and 8 may be brought closer together, allowing the lug 19 to slip into the slot 18. Relaxation of the pressure on the rim section 7 and reaction of the tire will then cause the rim sections 7 and 8 to spread to a less extent than before, thus bringing the undercut side 22 of the lug 19 into engagement with the beveled wall 20 of the slot 18, forming a locking connection between the two rim sections. When all the fasteners are thus applied, the tire is mounted in readiness to be placed upon a wheel for service or supported upon a spare tire holder for future use. The tire, of course, if carried as a spare tire, may be inflated, and the spreading pressure thereof on the rim sections 7 and 8 will serve to lock the parts with additional security together, but the construction of the parts may be such that pressure of the tire, even when uninflated, will be sufficient to hold the rim parts coupled against liability of casual disconnection under all ordinary conditions of service, while allowing release of the fastenings by inward pressure on the rim section 7, as previously explained. It will be observed that an effective locking action is obtained by having the undercut side 22 of the lug engage the beveled side 20 of the slot, so that the lug cannot possibly become disengaged until the rim member 7 is forcibly pressed inward for a releasing action. The beveled tip 24 is preferably formed in order to allow the lug to more easily and readily slide over the lower edge of the wall 20 in the locking and releasing actions. It will be observed that when the parts are in the position shown in Fig. 3, the wall 21 of the slot is spaced from the side 23 of the lug, whereby a sliding connection between the rim sections 7 and 8 is afforded for a purpose hereinafter described.

In applying a tire mounted upon the demountable rim 6 to a fixed wheel rim 1, and assuming that the nuts 5 are removed from the bolts, the rim 1 is slid laterally over upon the rim 1, via the flangeless side thereof, until the flange 10 of the rim section 8 abuts against the flange 3, the parts having been positioned so that the threaded ends of the bolts 4 engage and pass through the alined fastener arms 14. The nuts 5 are then applied and tightened up, as a result of which the wedge arms 16 are forced inwardly and wedged between the rims, thus locking them together. At the same time, the lugs 19 are moved inwardly across the slots 18, thus shifting their surfaces 22 out of engagement with the surfaces 20 and their surfaces 23 into engagement with the surfaces 21, thus binding the rim section 8 more firmly against the flange 3, the rim section 7 being firmly bound between the arms 15 and 16 of the fasteners. It will be observed, however, that the rim sections are still capable of a spreading motion under the lateral pressures of the sides of the inflated tire. Hence, if there should be any looseness of the fasteners, due to wear from long service or failure to tightly adjust the nuts, the pressure of the tire will still firmly hold the rim 6 against creeping or other displacement. Thus with my construction, creeping of the tire or demountable rim, and resultant chafing or cutting of the valve tube, cannot possibly occur. Also it will be evident that the tire and demountable rim will be firmly held against lateral motion or displacement.

In removing the tire for purpose of repairs or replacement, the nuts 5 are removed, thus freeing the fasteners 13, and the tire, demountable rim and fasteners are then slid as a unit off the flangeless side of the fixed rim. During the operation of removing the nuts, the rim section 7 is freed for outward motion under the tire pressure, and hence the lugs 19 will be automatically shifted from the position shown in Fig. 1 to that shown in Fig. 3, thus again locking the rim sections together.

If the tire is removed for purpose of placing a mounted new tire on the wheel and it should then be desired to use the removed rim and tire as a spare rim and tire, the parts may be mounted as they are on a tire carrier. If, however, the tire is removed for repairs or the placing of a new tire on the same rim, the fasteners 13 are disconnected, whereupon the rim sections may be pulled out easily from opposite sides of the tire. In disconnecting each fastener, the rim section 7 is pressed inward to move the lug 19 from the locking position shown in Fig. 3 to the releasing position shown in Fig. 1, whereupon the fastener may be pivoted on the hook 17 as a center of motion and arm 16 swung inwardly to withdraw the lug from the slot. The mode of applying the fasteners has been previously described.

In practice, the demountable rim is preferably split on one side of its circumferential center, or between its circumferential center and one of its side flanges, making one of the rim sections of less width than the other. This construction, in addition to other advantages, provides for the bridging by the wedge arm 16 of the gap between the rim sections and the locking of said sections through the use of a wedge arm of restricted length, so that the demountable rim may be applied to any type of fixed rim in common use to support a demountable rim.

It will be obvious from the foregoing description that the invention provides a construction of rim and fasteners which admits of the application and removal of a tire with ease and facility, provides a demountable rim employing but a single set of fasteners for securing it to the wheel rim and for holding the sections thereof together, and provides fasteners of a type which may be easily and freely manipulated at all times for a locking or releasing action.

Having thus described my invention, I claim:—

1. A demountable rim comprising two annular sections, one having slots therein, and bolt engaging wedge fasteners having lugs to engage said slots in the one rim section and hooks to engage the flange of the other rim section.

2. A demountable rim comprising a pair of annular rim sections, one of said rim sections having slots therein, and fastening members for coupling said rim sections and securing the same to a wheel, each fastening member having a bolt engaging portion, a rim engaging portion detachably and pivotally engaging the flange of the other rim section, a wedge adapted to bridge the joint between said rim sections and to be interposed between the same and the wheel felly, and a lug upon the wedge for detachable interlocking engagement with the slot in the first named rim member.

3. A demountable rim comprising a pair of annular rim sections each having a tire retaining flange at its outer edge, one of said rim sections having slots at intervals adjacent to its inner edge, and wedge fasteners having bolt engaging arms and rim engaging arms, the latter detachably and pivotally engaging the flange of the other rim section, said wedge fasteners having lugs for detachable interlocking engagement with the slots in the first named rim section.

4. A demountable rim comprising a pair of annular rim sections having tire retaining flanges at their outer edges, one of said rim sections having slots adjacent to its inner edge, said slots having outwardly and laterally inclined side walls, and wedge fasteners having bolt engaging arms and rim engaging arms, the latter detachably and pivotally engaging the flange of the other rim section, said wedge fasteners being provided with wedge-shaped lugs for detachable engagement with the slots in the first named rim section.

5. A demountable rim for vehicle wheels comprising a pair of annular rim sections having tire retaining flanges at their outer edges, and fastening members for coupling said rim sections and securing the same to a wheel, said fastening members having bolt engaging portions and provided with wedge arms bridging the joint between the rim sections, said wedge arms being provided with projections having slidable and detachable interlocking connection with one of the rim sections, and elements carried by the wedge arms pivotally engaging the flange of the other rim section.

6. A demountable rim comprising a pair of annular rim sections, each having a tire retaining flange at its outer edge, one of said rim sections having slots at intervals adjacent to its inner edge, the walls of said slots nearest the inner edge of the other rim section being inclined in a direction toward the outer face of the rim and the flanged outer edge of the second-named rim section, and fastening devices for detachably coupling said rim sections, each fastening device including a member pivotally engaging the flange of said second-named rim section, an arm carried by said member and extending therefrom transversely of the inner faces of the rim sections and bridging the joint between the same, and a lug carried by said arm to engage and interlock with a coacting slot in the first-named rim section, said lug being of less width than the slot to permit the rim sections to spread under tire pressure and to be moved inwardly toward each other and also to permit the lug to be swung into and out of engagement with the said slot on reverse pivotal movement of said member, a side of said lug being undercut to overhang the inclined wall of the slot when the rim sections are spread apart.

In testimony whereof I affix my signature.

WILLIAM GEO. CANION.